United States Patent [19]

Törnström

[11] 4,336,893
[45] Jun. 29, 1982

[54] DEVICE FOR ORIENTATION AND TRANSPORTATION OF ELONGATED OBJECTS SUCH AS TREE PLANTS

[76] Inventor: Ingvar Törnström, Viberget 18, 816 00 Ockelbo, Sweden

[21] Appl. No.: 30,033

[22] Filed: Apr. 13, 1979

[51] Int. Cl.³ .............................................. B65H 9/06
[52] U.S. Cl. ................................................... 221/171
[58] Field of Search ............... 221/159, 171, 173, 160, 221/289, 161, 291; 414/784; 111/2, 3

[56] References Cited

U.S. PATENT DOCUMENTS 4,067,268  1/1978  Lofgren et al. ........................ 111/2

FOREIGN PATENT DOCUMENTS 513546  9/1952  Belgium .............................. 221/160

Primary Examiner—Stanley H. Tollberg
Attorney, Agent, or Firm—William A. Drucker

[57] ABSTRACT

A device for orientation and transport of elongated objects such as tree plants comprises a container having an inclined bottom member which is movable to generate an outlet slot which successively widens upon the movement thereby causing the object resting upon the bottom member to take an upright position when the slot has reached such a width that the center of gravity of the object may enter the slot. The device also comprises apparatus for ejecting plants out of plant pots and a funnel shaped member provided below the container.

7 Claims, 5 Drawing Figures

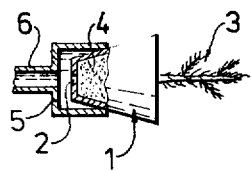
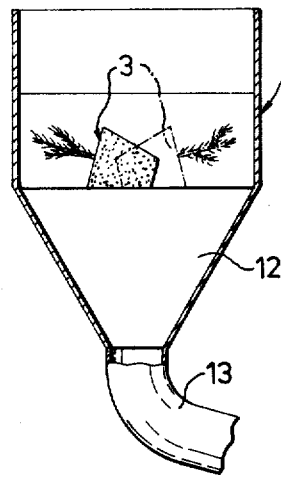
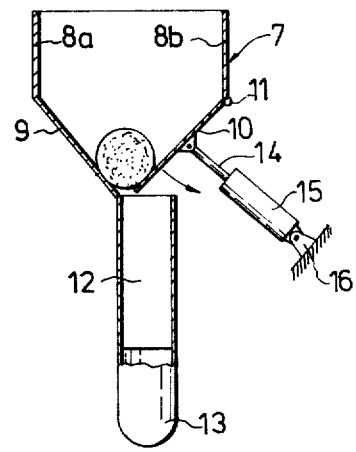
*Fig. 1*
*Fig. 2*
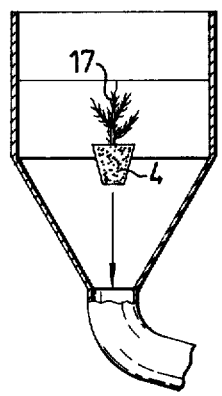
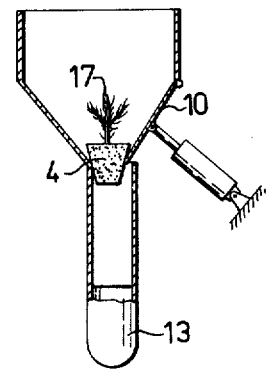
*Fig. 3*
*Fig. 4*
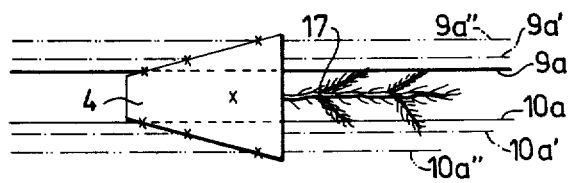
*Fig. 5*

DEVICE FOR ORIENTATION AND TRANSPORTATION OF ELONGATED OBJECTS SUCH AS TREE PLANTS

BACKGROUND OF THE INVENTION

FIELD OF THE INVENTION

The present invention refers to a device for orientation and transportation in a predetermined manner of elongated objects such as plants.

In planting machines and similar mechanical aids for planting a main problem is to rapidly and correctly transport the objects to the device by means of which the planting is to be performed in that it is of course necessary that the green portion of the plant is upwardly directed and the root portion is downwardly directed.

BRIEF SUMMARY OF THE INVENTION

It is therefore the primary object of the invention to solve this and related poroblems. Additional objects of this invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the device of this invention comprises a container into which the objects may fall one by one, said container having a width exceeding the total length of each object, respectively, such that an object in a lying position may rest against the bottom of the container, said bottom being inclined in relation to the horizontal plane and having at least one portion which is movable in such a manner that upon said movement an outlet slot is defined extending in the transverse direction of the container and successively increasing such that the object by virtue of its own weight will penetrate said slot and when the centre of gravity thereof has reached the slot will cause said object to swing to the upright position and thus be orientated in the desired manner and leave the slot in the desired orientation.

BRIEF DESCRIPTION OF THE DRAWING

The accompanying drawing which is incorporated in and constitutes a part of this specification illustrates one embodiment of the invention and, together with a description serves to explain the principles of the the invention. In the drawing:

FIG. 1 schematically illustrates an embodiment of the device in a side view

FIG. 2 shows the device of FIG. 1 in an end view,

FIG. 3 shows a part of the device according to FIG. 1 in an operational situation, seen from the side, FIG. 4 is an end view of the device of FIG. 3 in an operational situation, and FIG. 5 schematically shows the influence of the successively increasing width of the slot upon the orientation of the objects.

DETAILED DESCRIPTION OF THE PREFERRED EMBODIMENT

Reference will now be made in detail to the preferred embodiment of the invention, an example of which is illustrated in the accompanying drawing.

While the invention may be applied for transporting all kinds of objects having the centre of gravity asymmetrically locacted it is primarily intended to be used in connection with planting and other kinds of handling plants, and the following description will therefore be directed to a technique for planting tree plants.

The actual planting step will not be more closely described as it is considered to fall outside the scope of the invention.

The device shown in the drawing relates to the phase in the transport of plants which encompasses the release of the plants from the pots and the transfer of the plants to the selected location in a certain orientation, namely an orientation in which the root portion is downwardly directed and the green portion is upwardly directed. In the drawing reference numeral 1 designates a pot having a bottom hole 2 and containing a tree plant 3. The root portion of the plant has numeral 4. By means of a device—not shown—the pot 1 is brought into sealing contact with a box 5, which by means of a pipe line 6 communicates with a source of compressed air. Valves—not shown—are provided to control the supply of compressed air. By supplying compressed air to the location of the pot illustrated in FIG. 1 to the box 5 while the pot is retained in sealing contact with the edges of the box, the plant is released from the pot by means of the pressure of said compressed air. A container 7 is provided below the box 5 and the location of the container in relation to the box is such that the plant ejected from the pot will fall into said container. As seen in FIG. 2 the container has side walls 8a, 8b and not denoted end walls. The bottom of the container is inclined and comprises in the embodiment shown a fixed oblique member 9 and a pivotable member 10, which is pivotally connected to the side wall 8b by the upper portion thereof via a hinge 11 or the like. The bottom of the container merges into a funnel shaped portion 12, which in turn merges into a tubular member 13. For the pivotal movement of the pivotable member—in the following referred to as the door—the free end of a piston 14 of a pressure medium operated cylinder 15 is connected thereto. The cylinder may be pivotally connected to a stationary part 16 of the device.

It is obvious that the orientation of the plant ejected from the pot when reaching the container is not unitary but when it reaches the bottom thereof, the plant either has the orientation denoted by full lines in FIG. 1, or the orientation shown in dashed lines of FIG. 1.

When the door by means of the pressure medium cylinder is swung in the direction of the arrows in FIG. 2 the width of the slot between the door 10 and the fixed bottom member 9 will successively increase. FIG. 5 illustrates the steps of action wherein a cross marks the centre of gravity of the plant. When the free edge portions of the bottom member 9 and of the door 10 are in the location shown in full lines, the portion of the plant which is located to the left of the contact points between the plant and the edge portions has the possibility to penetrate through the slot. When the edge portions are in the location 9a' and 10a', respectively, the part of the plants' root portion having the capability to penetrate through the slot is further increased and in the position 9a" and 10a", respectively, the part of the root portion which may penetrate through the slot is even larger and since the centre of gravity is not located to the left of the contact points between the root portion of the plant and the edge portions 9a" and 10a", the plant will tilt from the substantially horizontal position to the vertical position shown in FIG. 3 and FIG. 4. When the width of the slot exceeds the largest diameter of the root portion, the plant will fall downwardly through the slot and reaches via the funnel shaped portion 12 the tubular portion 13, which of course may directly lead to the planting means. However, it is often necessary to permit the tubular portion to extend in a horizontal or oblique direction and in order to thereby bring about the transport which thus is not to take place only by means of gravity, compressed air may be supplied to blow the plant through the tube. The plant may of course also optionally be sucked through the tube. Thus, the device solves the existing problem in a very simple and efficient manner.

It is understood that the device described may be varied in many respects falling within the scope of the claims. Thus, it is possible, for example, to make the bottom member 9 as well as the bottom member 10 pivotable. Further, it may be noted that the expression "conical" as to the portion of the object where the centre of gravity is located has to be seen in its widest sense and may, for instance, include spherical shapes or any shape permitting the guiding and controlling of the object in the disclosed manner. The ejecting step may also be performed by means of pins or similar means rather than by means of air either by moving the pin or pins or by pressing the pot against the pins.

What is claimed is:

1. A device for orientation and transportation of elongated objects having a center of gravity, comprising in combination,
    (a) a container having walls spaced apart a distance greater than the width of said object,
    (b) a slot at the bottom of said container,
    (c) first means forming the bottom of said container disposed between said side walls and said slot and forming said slot,
    (d) second means coupled to said first means to widen said slot a predetermined distance until the center of gravity of said object has reached said slot to orient said object in an upright position, and
    (e) third means responsive to further widening of said slot to direct said object away from said slot.

2. A device as claimed in claim 1, wherein the bottom of the container comprises two obliquely downwardly converging portions one being fixed, the other one pivoted to swing from an initial position wherein none or a relatively narrow slot exists between the lower end parts of the portions to a position wherein said slot is so wide that said slot permits passage of the object.

3. A device as claims in claim 1, wherein the bottom of the container merges into a funnel shaped portion, the extension of which, in a horizontal plane, substantially corresponds to or somewhat exceeds the maximum slot opening in operation and the extension of which, in a horizontal plane perpendicular thereto, from an upper maximum value, corresponding to the extension of the container in the same direction, decreases to a value which substantially corresponds to the maximum slot opening in operation and that said funnel shaped portion in turn may merge into a tubular portion.

4. A device as claimed in claim 1, wherein the objects are plants having conical root portions.

5. A device as claimed in claim 1, wherein the objects are plants, the root portions being contained in conical pots having holes in the bottoms thereof, means for ejecting the plants out from the pots into the container by sealingly connecting said pots with the bottoms thereof to boxes supplying compressed air for ejecting the plants out of the pots.

6. A device as claimed in claim 3, wherein the objects are either blown or sucked through the tubular portion towards a utilization means.

7. A device as claimed in claim 1, wherein the objects are plants the root portions being contained in pots provided with holes in the bottoms thereof and pin means to release the plants from said pots.

* * * * *